United States Patent

[11] 3,614,646

[72] Inventor Earl T. Hansen
Salt Lake City, Utah
[21] Appl. No. 676,275
[22] Filed Oct. 18, 1967
[45] Patented Oct. 19, 1971
[73] Assignee Sperry Rand Corporation

[54] PHOTOMULTIPLIER TUBE AGC USING PHOTOEMITTER-SENSOR FOR DYNODE BIASING
5 Claims, 1 Drawing Fig.

[52] U.S. Cl. .......... 330/59, 330/42, 250/207
[51] Int. Cl. .......... H03f 17/00
[50] Field of Search .......... 330/59, 42; 250/207, 214

[56] References Cited
UNITED STATES PATENTS

| | | | |
|---|---|---|---|
| 2,585,044 | 2/1952 | Sanders | 330/42 |
| 3,015,033 | 12/1961 | Muench | 250/207 |
| 3,202,926 | 8/1965 | Ford et al. | 330/59 |
| 3,354,773 | 11/1967 | Shreve | 250/204 |

*Primary Examiner*—Nathan Kaufman
*Attorney*—S. C. Yeaton

ABSTRACT: A photomultiplier tube automatic gain control circuit wherein the biasing potentials between a plurality of adjacent dynodes are varied inversely as the amplitude of the photomultiplier output signal. The output signal is detected and applied to a photoemitter-sensor connected in shunt with the biasing network for the aforesaid dynodes.

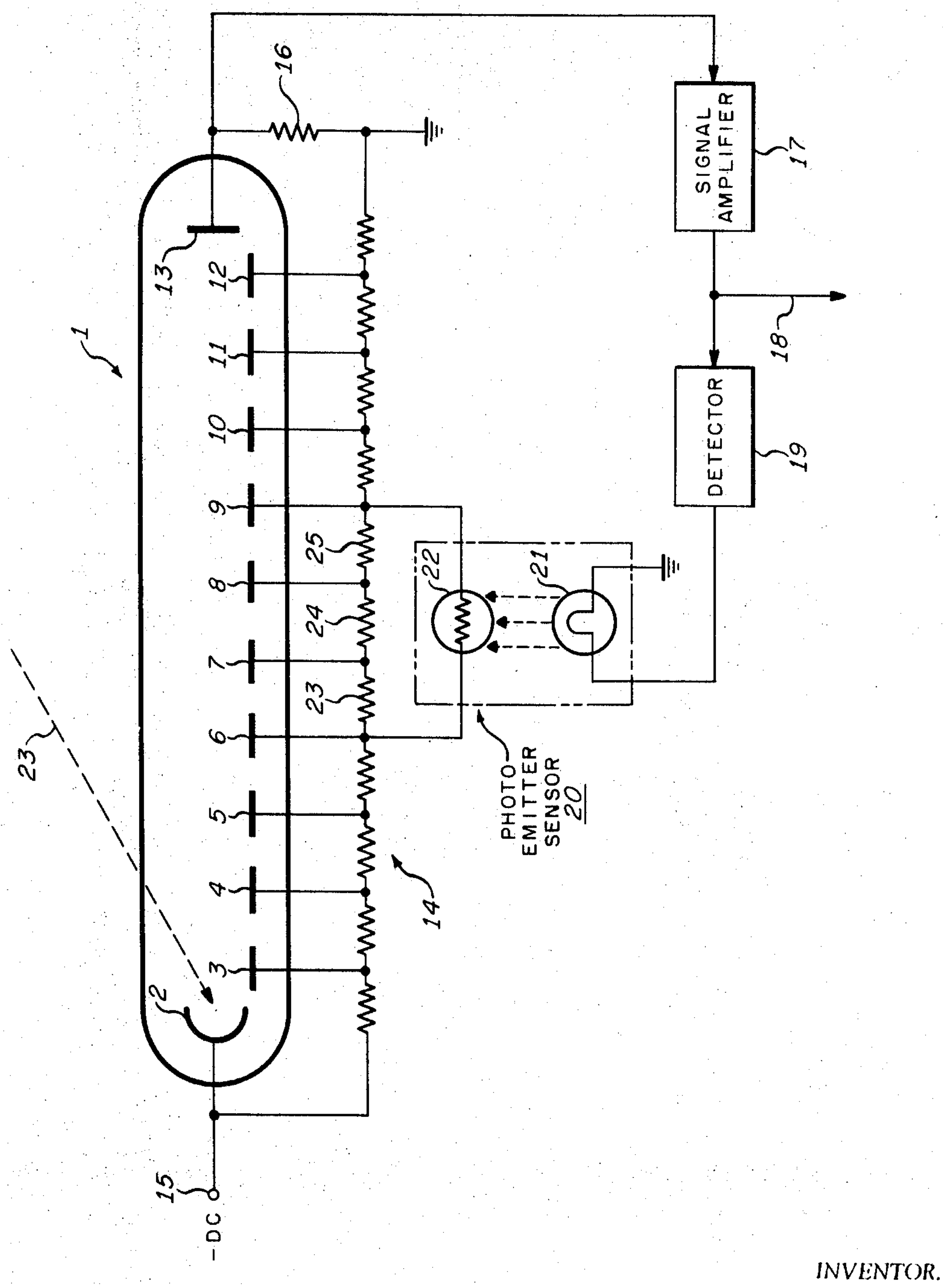
INVENTOR.
EARL T. HANSEN
BY
[signature]
ATTORNEY

PHOTOMULTIPLIER TUBE AGC USING PHOTOEMITTER-SENSOR FOR DYNODE BIASING

BACKGROUND OF THE INVENTION

Photomultiplier tubes are well known to possess a gain characteristic which is highly sensitive to variations in the electrode biasing potentials, in particular to the dynode biasing potentials. Perhaps the most common solution to the problem of gain variation is the use of a closely regulated power supply for providing the biasing potentials. In addition to the objectionable cost of well-regulated power supplies, they do not prevent long-term variations in the photomultiplier tube output signal attributable to causes other than biasing potential variations. For example, in television broadcasting instances wherein a film transparency is scanned and then converted by a photomultiplier tube into corresponding video signals, provision also must be made for variations in the density of the film transparencies, the brightness of the scanning light and the gain of output signal amplifiers in order to stabilize the long-term amplitude of the resultant output video signal.

SUMMARY OF THE INVENTION

An automatic gain control circuit for minimizing long-term variations in the amplified output of a photomultiplier tube attributable to changes in the intensity of the light illuminating the photomultiplier tube, in the amplitude of the photomultiplier tube electrode biasing potentials and in the gain of output signal output amplifiers is described. The photomultiplier tube output signal is amplified and the long-term amplitude variations are detected and then applied to a photoemitter-sensor comprising an incandescent lamp and a photoconductor resistor. The intensity of the light emitted by the lamp is determined by the amplitude of the amplified and detected photomultiplier tube output signal. The light from the lamp illuminates the photoconductor resistor and changes its resistance in accordance with intensity of the light. The photoconductor resistor is connected in shunt with the biasing circuit for a plurality of adjacent dynodes of the photomultiplier tube. Changes in the photomultiplier tube output signal attribute to long-term changes in the intensity of the incandescent light, changes in photomultiplier tube gain and changes in the output signal amplifier gain are minimized automatically by compensating changes in the biasing potentials applied between the aforesaid dynodes.

BRIEF DESCRIPTION OF THE DRAWING

The sole FIGURE is a simplified schematic drawing of a preferred embodiment of the invention.

DESCRIPTION OF THE PREFERRED EMBODIMENT

Referring to the sole FIGURE, a conventional photomultiplier tube is represented by the numeral 1. The tube comprises photocathode 2, dynodes 3–12 and anode 13. A resistor biasing network 14 is connected between cathode 2 and ground. A negative direct current source (not shown) is connected to cathode 2 via terminal 15.

Anode 13 is connected to ground via resistor 16. The photomultiplier tube output signal developed across resistor 16 is applied by signal amplifier 17 to output line 18 and to detector 19. The automatic gain controlled signal appears on output line 18. Detector 19 includes a long-time constant filter for producing an output signal representing the long-term variations in the amplitude of the signal from amplifier 17.

The signal at the output of detector 19 is applied to incandescent lamp 21 of photoemitter-sensor 20 which also comprises photoconductor resistor 22. As is well understood in the art, the resistance of photoconductor resistor 22 varies inversely as the intensity of light received from lamp 21. An appreciable change in resistance can be obtained in response to a relatively small change in the current applied to lamp 21 from detector 19.

Photoconductor resistor 22 is connected in shunt with resistors 23, 24 and 25 of biasing network 14. A variation in the resistance of photoconductor resistor 22 changes the biasing potential between dynode pair 6 and 7, dynode pair 7 and 8 and dynode pair 8 and 9 thereby altering the overall gain of photomultiplier 1. Thus, it can be seen that the long-term amplitude of the output signal on line 18 is controlled by the action of the automatic gain control circuit irrespective of long-term intensity variations in the incident light (represented by ray 23) falling on photocathode 2, changes in the gain of the photomultiplier tube 1 and changes in the gain of signal amplifier 17. Although it is not necessary that the photoconductor resistor 22 be connected across a central portion of biasing network 14, such a connection is preferred. Possible loss of signal-to-noise ratio could result if the photoconductor resistor were connected across the dynodes at the cathode end of the biasing network. There is also the possibility that signal saturation might occur at some dynode preceding the controlled group of dynodes if the connection were made at the anode end. It has been found that the automatic gain control circuit of the present invention is capable of wide-range gain control with excellent linearity of the transfer characteristic of the photomultiplier tube at minimum complexity and cost by virtue of the use of the photoemitter-sensor as an integral part of the gain control loop.

What is claimed is:

1. An automatic gain control circuit for a photomultiplier tube having a multiplicity of dynodes, said circuit comprising
   - a source of current,
   - an impedance network connected across said source for biasing said dynodes,
   - a photoconductor resistor connected across a portion of said network for biasing a plurality of adjacent dynodes,
   - a lamp for illuminating said resistor, and
   - means for detecting the long-term amplitude variations in the current flowing through said photomultiplier tube,
   - said means being connected between said photomultiplier tube and said lamp.

2. An automatic gain control circuit as defined in claim 1 wherein said impedance network is a resistor bleeder network.

3. An automatic gain control circuit as defined in claim 1 wherein said photoconductor resistor is connected across a central portion of said network for biasing a central plurality of adjacent dynodes.

4. An automatic gain control circuit as defined in claim 1 wherein said photomultiplier tube has a cathode and an anode and further including an impedance means,
   - one end of said impedance network being connected to said cathode,
   - said impedance means being connected between said anode and the other end of said impedance network, and
   - said source being connected between said cathode and the junction of said impedance means and said impedance network.

5. An automatic gain control circuit as defined in claim 4 wherein said impedance network is a resistor bleeder network and said impedance means is a resistor.